US008085318B2

(12) United States Patent
Ciudad et al.

(10) Patent No.: US 8,085,318 B2
(45) Date of Patent: Dec. 27, 2011

(54) REAL-TIME IMAGE CAPTURE AND MANIPULATION BASED ON STREAMING DATA

(75) Inventors: Jean-Pierre Ciudad, San Francisco, CA (US); Luke Bellandi, San Francisco, CA (US); Gregory N. Christie, San Jose, CA (US); Richard Dellinger, San Jose, CA (US); Scott Forstall, Mountain View, CA (US); Mike Matas, Palo Alto, CA (US); Erika Misaki, San Francisco, CA (US); Kevin Tiene, Cupertino, CA (US); Marcel M W A van Os, San Francisco, CA (US); Steve Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 878 days.

(21) Appl. No.: 11/248,630

(22) Filed: Oct. 11, 2005

(65) Prior Publication Data
US 2007/0081740 A1    Apr. 12, 2007

(51) Int. Cl.
*H04N 5/262* (2006.01)
(52) U.S. Cl. .................... 348/239; 348/333.05
(58) Field of Classification Search ............... 348/239, 348/333.05, 333.11; 715/810
See application file for complete search history.

(56) References Cited

U.S. PATENT DOCUMENTS

| 4,881,127 A | 11/1989 | Isoguchi et al. |
| 5,262,815 A | 11/1993 | Aumiller |
| 5,402,513 A | 3/1995 | Schafer |
| 5,459,529 A | 10/1995 | Searby et al. |
| 5,519,828 A | 5/1996 | Rayner |
| 5,534,917 A | 7/1996 | MacDougall |
| 5,670,985 A | 9/1997 | Cappels, Sr. et al. |
| 5,687,306 A | 11/1997 | Blank |
| 5,726,672 A | 3/1998 | Hernandez et al. |
| 5,737,552 A | 4/1998 | Lavallee et al. |
| 5,748,775 A | 5/1998 | Tsuchikawa et al. |
| 5,752,029 A | 5/1998 | Wissner |
| 5,778,108 A | 7/1998 | Coleman, Jr. |
| 5,781,198 A | 7/1998 | Korn |
| 5,812,787 A | 9/1998 | Astle |
| 5,854,893 A | 12/1998 | Ludwig et al. |
| 5,914,748 A | 6/1999 | Parulski et al. |

(Continued)

FOREIGN PATENT DOCUMENTS

EP    1217598    6/2002

(Continued)

OTHER PUBLICATIONS

"iChat" [online], retrieved from the Internet on Feb. 18, 2008, 5 pgs. http://en.wikipedia.org/wiki/IChat.

(Continued)

*Primary Examiner* — Gevell Selby
(74) *Attorney, Agent, or Firm* — Fish & Richardson P.C.

(57) ABSTRACT

Systems and techniques to provide image capture and manipulation. In general, in one implementation, the technique includes receiving an input stream including image data from a source, displaying the input stream in real-time including displaying a plurality of instantiations of the stream at a same time, each stream different, the step of displaying including applying a filter to each instantiation of the input stream, and receiving a prompt to select one of the instantiations of the stream.

58 Claims, 8 Drawing Sheets

U.S. PATENT DOCUMENTS

| | | | |
|---|---|---|---|
| 5,923,791 A | 7/1999 | Hanna et al. | |
| 5,956,026 A | 9/1999 | Ratakonda | |
| 5,995,095 A | 11/1999 | Ratakonda | |
| 6,064,438 A | 5/2000 | Miller | |
| 6,111,562 A | 8/2000 | Downs et al. | |
| 6,148,148 A | 11/2000 | Wain et al. | |
| 6,230,172 B1 | 5/2001 | Purnaveja et al. | |
| 6,237,025 B1 | 5/2001 | Ludwig et al. | |
| 6,298,197 B1 | 10/2001 | Wain et al. | |
| 6,307,550 B1 | 10/2001 | Chen et al. | |
| 6,344,874 B1 | 2/2002 | Helms et al. | |
| 6,351,762 B1 | 2/2002 | Ludwig et al. | |
| 6,400,374 B2 | 6/2002 | Lanier | |
| 6,414,707 B1 | 7/2002 | Agraharam et al. | |
| 6,434,266 B1 | 8/2002 | Kanno et al. | |
| 6,507,286 B2 | 1/2003 | Weindorf et al. | |
| 6,583,806 B2 | 6/2003 | Ludwig et al. | |
| 6,594,688 B2 | 7/2003 | Ludwig et al. | |
| 6,624,828 B1 | 9/2003 | Dresevic et al. | |
| 6,714,216 B2 | 3/2004 | Abe | |
| 6,715,003 B1 * | 3/2004 | Safai | 348/211.3 |
| 6,716,103 B1 * | 4/2004 | Eck et al. | 463/45 |
| 6,760,042 B2 | 7/2004 | Zetts | |
| 6,912,327 B1 | 6/2005 | Hori et al. | |
| 6,933,979 B2 * | 8/2005 | Gonzales et al. | 348/362 |
| 6,954,894 B1 | 10/2005 | Balnaves et al. | |
| 6,988,244 B1 | 1/2006 | Honda et al. | |
| 6,988,248 B1 | 1/2006 | Tang et al. | |
| 7,030,872 B2 | 4/2006 | Tazaki | |
| 7,064,492 B1 | 6/2006 | Vijeh | |
| 7,095,392 B2 | 8/2006 | Lin | |
| 7,095,395 B2 | 8/2006 | Bu | |
| 7,103,840 B2 * | 9/2006 | Ihara et al. | 715/716 |
| 7,124,366 B2 | 10/2006 | Foreman et al. | |
| 7,127,149 B1 | 10/2006 | Lin | |
| 7,152,093 B2 | 12/2006 | Ludwig et al. | |
| 7,165,219 B1 | 1/2007 | Peters et al. | |
| 7,206,809 B2 | 4/2007 | Ludwig et al. | |
| 7,421,470 B2 | 9/2008 | Ludwig et al. | |
| 7,433,921 B2 | 10/2008 | Ludwig et al. | |
| 7,546,544 B1 | 6/2009 | Weber et al. | |
| 7,739,599 B2 * | 6/2010 | Patten et al. | 715/723 |
| 2002/0019833 A1 | 2/2002 | Hanamoto | |
| 2002/0105589 A1 * | 8/2002 | Brandenberger et al. | 348/360 |
| 2002/0140740 A1 * | 10/2002 | Chen | 345/810 |
| 2002/0167540 A1 | 11/2002 | Dobbelaar | |
| 2002/0180803 A1 | 12/2002 | Kaplan et al. | |
| 2002/0194195 A1 | 12/2002 | Fenton et al. | |
| 2002/0198909 A1 | 12/2002 | Huynh et al. | |
| 2003/0046348 A1 | 3/2003 | Pinto et al. | |
| 2003/0047099 A1 | 3/2003 | Hanyu | |
| 2003/0067435 A1 | 4/2003 | Liu | |
| 2003/0090507 A1 | 5/2003 | Randall et al. | |
| 2003/0189588 A1 | 10/2003 | Girgensohn et al. | |
| 2003/0193520 A1 | 10/2003 | Oetzel | |
| 2003/0210261 A1 | 11/2003 | Wu et al. | |
| 2004/0017390 A1 | 1/2004 | Knowlton et al. | |
| 2004/0021684 A1 | 2/2004 | Miller | |
| 2004/0032497 A1 | 2/2004 | Ying et al. | |
| 2004/0085340 A1 | 5/2004 | Dimitrova et al. | |
| 2004/0125124 A1 | 7/2004 | Kim et al. | |
| 2004/0196250 A1 | 10/2004 | Mehrotra et al. | |
| 2004/0227751 A1 | 11/2004 | Anders | |
| 2004/0233125 A1 | 11/2004 | Tanghe et al. | |
| 2004/0239799 A1 * | 12/2004 | Suzuki et al. | 348/370 |
| 2005/0073575 A1 | 4/2005 | Thacher et al. | |
| 2005/0117811 A1 * | 6/2005 | Hoshino | 382/260 |
| 2005/0174589 A1 * | 8/2005 | Tokiwa | 358/1.9 |
| 2005/0194447 A1 | 9/2005 | He et al. | |
| 2006/0018653 A1 | 1/2006 | Kido | |
| 2006/0050151 A1 * | 3/2006 | Fujinawa | 348/207.99 |
| 2006/0055828 A1 | 3/2006 | Henry et al. | |
| 2006/0274161 A1 | 12/2006 | Ing et al. | |
| 2006/0284895 A1 | 12/2006 | Marcu et al. | |
| 2007/0009028 A1 | 1/2007 | Lee et al. | |
| 2007/0081094 A1 | 4/2007 | Ciudad et al. | |
| 2008/0303949 A1 | 12/2008 | Ciudad et al. | |
| 2008/0307307 A1 | 12/2008 | Ciudad et al. | |
| 2010/0118179 A1 | 5/2010 | Ciudad et al. | |

FOREIGN PATENT DOCUMENTS

| | | |
|---|---|---|
| EP | 1 775 939 | 4/2007 |
| JP | 2002335432 | 11/2002 |
| JP | 2004180245 | 6/2004 |
| JP | 2004187154 | 7/2004 |
| JP | 2004260560 | 9/2004 |
| JP | 2004286781 | 10/2004 |
| JP | 2004-350208 | 12/2004 |
| JP | 2004349843 | 12/2004 |
| JP | 2005241814 | 9/2005 |
| JP | 2007-110717 | 4/2007 |
| WO | WO2004054239 | 6/2004 |

OTHER PUBLICATIONS

"Welcome to Mac OS X" (slide presentation), Apple Computer, Inc. (2002), 21 pages.

EP Search Report for Application/Patent Nos. 06021059.8-1241/1775939, mailed Apr. 9, 2009, pp. 1-7.

Office Action, issued Nov. 11, 2008, in Japan Application No. 2006-275583.

Office Action, issued Mar. 17, 2009, in Japan Application No. 2006-275583.

Stone. "iDVD 2—OS 10.1", retrieved from the Internet on Aug. 15, 2009 at : URL : <http://www.kenstone.net/fcp_homepage/basic_idvd_2.html>, Dec. 17, 2001.

\* cited by examiner

REAL-TIME IMAGE CAPTURE AND MANIPULATION BASED ON STREAMING DATA

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

CROSS REFERENCE TO RELATED CASES

This application is related to the following co-pending patent applications, which are hereby incorporated by reference in their entirety:

U.S. patent application Ser. No. 11/249,130, entitled Image Capture Using Display Device as Light Source, filed Oct. 11, 2005.

U.S. patent application Ser. No. 10/424,253, entitled METHOD AND APPARATUS FOR MANIPULATING AN IMAGE TO FORM AN ICON, filed Apr. 28, 2003.

U.S. patent application Ser. No. 10/742,957, entitled CREATING A THEME USED BY AN AUTHORING APPLICATION TO PRODUCE A MULTIMEDIA PRESENTATION, filed Dec. 22, 2003.

U.S. patent application Ser. No. 10/337,924, entitled METHOD AND APPARATUS FOR CREATING MULTIMEDIA PRESENTATIONS, filed Jan. 6, 2003.

TECHNICAL FIELD

This specification describes systems and methods for image capture and manipulation.

BACKGROUND

Systems and methods for providing image capture and manipulation are described. Many software applications now accept image data such as head shots to identify, for example, the sender of an electronic mail message, an Internet chat buddy, or to identify a caller on a voice-over-IP communication link. Novice computer users may not know how to associate their picture with these applications. Furthermore, a user may wish to modify their picture before using it. While many software packages provide very sophisticated tools for image editing, novice users can find these packages too cumbersome, especially if the user wants to quickly experiment with different effects.

SUMMARY

This specification describes systems and methods for image capture and manipulation.

In one aspect, an input stream including image data is received from a source. The input stream is displayed in real-time including displaying a plurality of instantiations of the stream at a same time, each stream different, the step of displaying including determining a filter to apply to each instantiation of the input stream and applying the filter to a respective instantiation. A prompt is received to select one of the instantiations of the stream. One frame is selected from the selected stream to display as a still image including applying the selected filter to the still image prior to display.

Implementations may include one or more of the following features. Receiving can be from a camera attached to a computer or from a phone. There can be nine instantiations of the input stream. A filter can be applied to the image data. User selection of a filter to apply to each stream can be received. Two mosaics can be selectively displayed, each with a predetermined number of instantiations of the stream.

In another aspect, input data is received from an image source. Plural variations of the input data are displayed at a same time, each variation a filtered version of the input data. A prompt is received to select one of the plural variations. The image source is prompted to produce new input data. A still image is displayed including applying a filter to the new input data, the filter being associated with the selected variation.

Implementations may include one or more of the following features. Applying can utilize an effect. An effect can include one or more of the following: cropping, flipping, adding a border, adding a backdrop, scaling, color manipulation, blurring, sharpening, distorting, transforming geometry, or pattern generation. A filter can be a programmatic representation of an effect. Displaying the plural variations can include determining a unique cell to display each variation of the input data in. A flash can be provided through a display device attached to a computer. Capturing the new input data can be in coincidence with the flash.

In another aspect, plural variations of an image stream are simultaneously displayed, each having an associated effect, including applying a given effect to the image stream to produce a given variation. Input is received to capture the image stream. Input is received to select a variation to be captured. The captured selection is displayed.

Implementations may include one or more of the following features. The image stream can be a time-ordered sequence of images originating from a digital camera. The captured selection can be flipped. The captured selection can be displayed as collection of captured selections. User selection of an effect to apply to each variation can be received. The captured selection can be provided to one of: an electronic mail message, an address book application, an account profile, an interactive chat profile, or an image organizer application.

In another aspect, an input is received to select an image in a first user interface having a collection of images, the image transformed by a first effect. Multiple variations of the selected image are displayed simultaneously in a second user interface without the transformation of the first effect, each variation having an associated second effect, including applying a given second effect to the selected image to produce a given variation. An input is received to select a variation. The selected image is transformed by the second effect associated with the selected variation.

Implementations may include one or more of the following features. The first user interface and the second user interface can be displayed simultaneously but may not overlap.

In another aspect, a first image data is selected from live image data, the live image data originating from a digital camera. A first image effect is selected from a plurality of image effects, each image effect in the plurality being associated with a unique display region. The first image effect is applied to the first image data, or to a copy of the first image data, to create a first image, the first image displayed on a first display region associated with the first image effect. Selection of the first display region is detected. Second image data is selected from the live image data, the second image data occurring at a point in time later than the first image data. The first image effect is applied to the second image data, or to a copy of the second image data, to create a second image, the second image displayed on a second unassociated display region.

Implementations may include one or more of the following features. The point in time can be an offset from when the input is detected. The digital camera can be a phone, a portable music player, or a portable electronic game playing device. The live image data can be a continuous time-ordered sequence of packets or frames containing image data. The selection of the first display region includes detecting input incident on the first display region.

Implementations of the invention can realize one or more of the following advantages. A user can easily obtain and apply effects to an image for use in various applications. Different effects (e.g., using one or more filters) can simultaneously be applied to an image (or image stream) with the results being displayed side-by-side. This allows a user to immediately compare different effects and choose the most desirable one. Image data can easily be transferred to other applications such as email, an address book, contacts, Internet chat, and image organization applications. In one embodiment, the underlying image data is not changed. An image strip of the pictures, preferably recent pictures, is provided. One button is provided for image capture and selection. And a count-down timer can be provided before an image is captured.

These general and specific aspects may be implemented using a system, a method, or a computer program, or any combination of systems, methods, and computer programs. The details of one or more implementations of the invention are set forth in the accompanying drawings and the description below. Other features, aspects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
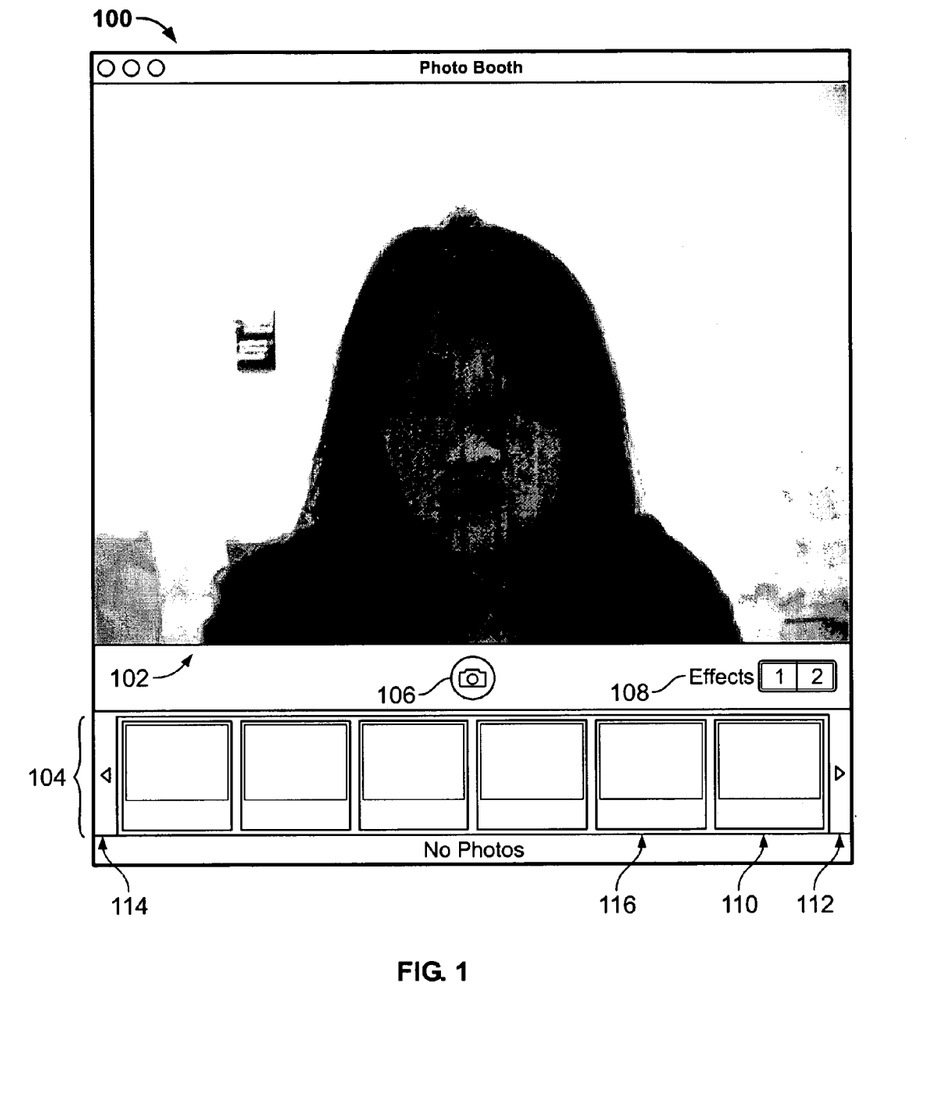
FIG. 1 shows a graphical user interface for viewing a still or a live image.

FIG. 1 shows a graphical user interface (GUI) for viewing a still or live image.

Although a GUI is illustrated, other user interfaces can be used in systems and methods for providing image capture and manipulation, including user interfaces that allow for user interaction by means of sound, voice, gesture, eye movement and/or use of remote control devices. A still or live image is displayed in region 102 of window 100. For example, the image may be obtained from an image capture device (e.g., a digital still camera or a digital video camera) integrated with or mounted in or located in proximity to a user's computer display. A camera button 106 allows the user to switch between a still image and a live image. A live image reflects a continuous stream of images captured by the image capture device. The camera button 106 can also be used to allow the user to capture an image (see below).

Image strip 104 presents optionally scaled versions of previously captured images. In this illustration, there are no images captured and so the image strip 104 displays blank images (110, 116). Alternatively, the image strip 104 is empty if there are no captured images. Alternatively, the image strip is not presented. The image strip 104 can hold more images than can be displayed. A user can scroll to the left or to the right through images using scroll buttons (112 and 114). The images in the image strip can be sorted in order of the date and/or time that they were captured, the date and/or time they were last modified, or other suitable criteria. In one embodiment, the image strip 104 can show more than one row and can scroll vertically. For example, the image strip 104 might show six images across the first row and the next six images in the second row, etc. In another embodiment, the image strip 104 can be located at other locations and in other orientations, e.g. vertical along the left side of the window 100.

Figure 2:
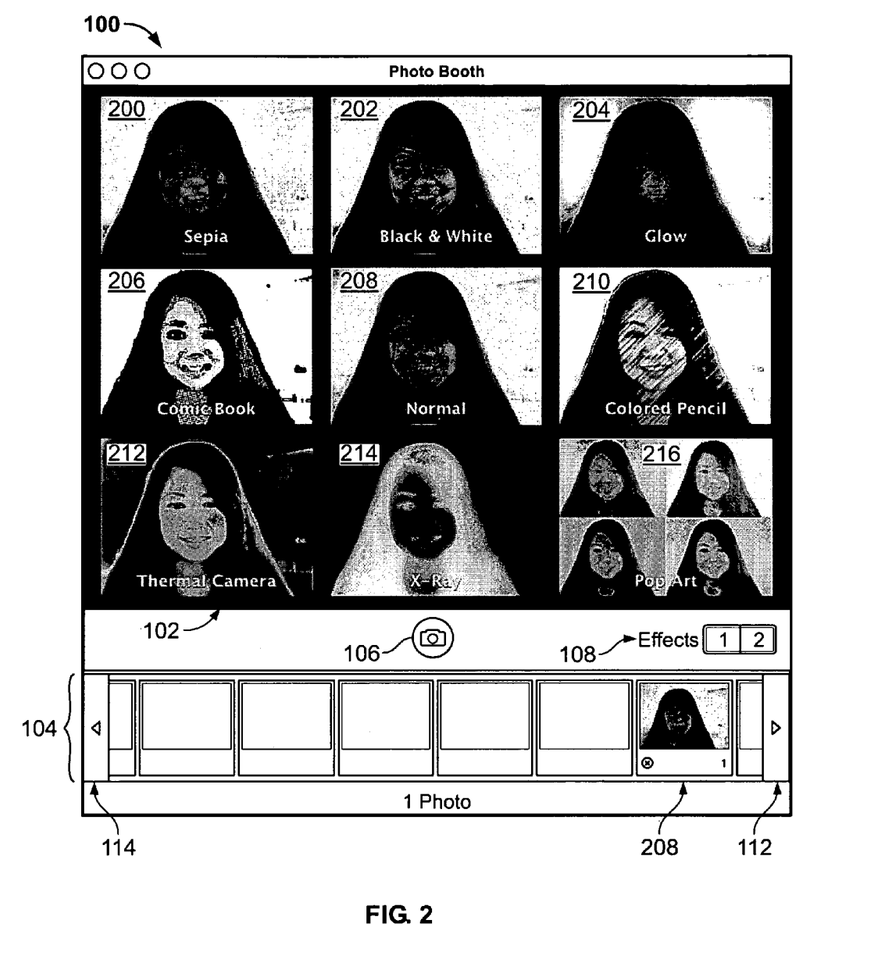
FIG. 2 shows a graphical user interface for displaying and selecting a first set of image effects.
Figure 3:
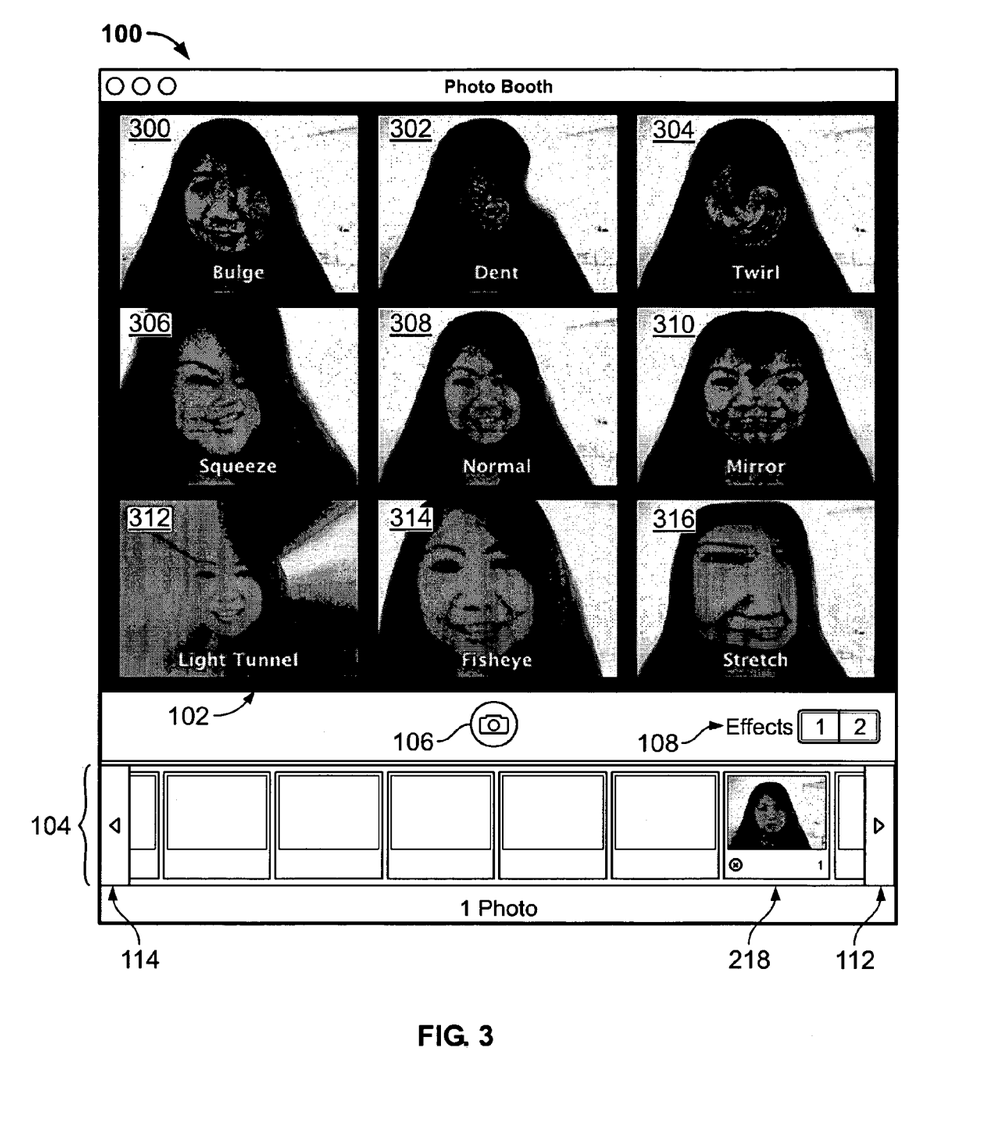
FIG. 3 shows a graphical user interface for displaying and selecting a second set of image effects.

An effects button 108 presents a filter mosaic (or "mosaic") in region 102 (see FIGS. 2 and 3). The mosaic includes a plurality of cells (e.g., 200, 202, 204, 206, 208, 210, 212, 214, and 216). Associated with each cell is an effect. One effect can be a nullity effect, which results in the un-edited presentation of the source image in the respective cell. Combinations of effects can be defined and associated with a cell. The source image, whether live or still, is presented in each cell of the mosaic.

FIG. 2 shows a GUI for displaying and selecting a first set of image effects.

A mosaic is displayed in region 102 of window 100. Region 102 is subdivided into cells in which copies or instantiations of a still or live image are simultaneously rendered, each with an applied effect. An effect is a transformation or distortion of a still or live image. An effect can include, without limitation, one or more of the following: cropping, providing a mirror image ("flipping"), adding a border surrounding the image, adding a backdrop, scaling, color manipulation, blurring, sharpening, distorting, transforming geometry, and pattern generation. By way of illustration, instantiation cell 200 shows a "Sepia" effect applied to an image instantiation. Center cell 208 shows the still or live image without applying an effect or by applying a null effect. Other effects are possible as illustrated in instantiation cells 202, 204, 206, 208, 210, 212, 214, and 216 of FIG. 2, and cells 300, 302, 304, 306, 308, 310, 312, 314, and 316 of FIG. 3. The ability to see simultaneously how different effects alter an image allows a user to quickly compare the effects and select a desired effect.

When conventional handheld digital cameras (still or video) capture pictures, the pictures as captured are not flipped. An effect that flips an image is useful if any text will be visible in the image since photographed text appears backwards or if the user is taking a self portrait. A user can optionally specify that the "flip" effect always be applied before or after any other effects are applied. In one embodiment, the "live preview" mode (see below) presents a live, flipped image. In this way, the live preview provides the user with intuitive real-time feedback, as if they were looking into a mirror. In one embodiment, the "flip" effect is applied to captured images or image instances by default, whether or not other effects are applied.

In one implementation, an effect can be applied to an instantiation using the Core Image application programming interface (API) which is part of the Quartz Core framework image processing technology available from Apple Computer, Inc. of Cupertino, Calif. The Core Image API provides access to built-in image filters for both video and still images and provides support for creating custom filters.

Additional effects beyond those displayed in region 102 are available by selecting different mosaics, where the different mosaics have different sets of effects associated with the cells. In one implementation, selection of the effects button 108 can allow a user to view different mosaics (e.g., FIG. 2 and FIG. 3). In another implementation, repeatedly selecting the effects button 108 will allow the user to cycle through different mosaics.

Although there are nine instantiation cells in this figure, more or fewer are possible. In one implementation, the number of cells displayed is user configurable. The cells can also be made larger if there are fewer cells, or smaller to accommodate a greater number of cells. Different size cells are possible at a same time. Associated image instantiations can be scaled to accommodate a given cell size. In another implementation, a mosaic can be presented in a scrollable area. For example, more than nine cells could be shown and a scroll bar could be provided. In yet another implementation, cells can be reordered by dragging and dropping the cells.

In one embodiment, a user can define for a given cell what effect or series of effects to apply. In another embodiment, a user can drag and drop cells onto each other to create cells with multiple effects. For example, if a first cell having a first effect is dropped on a second cell having a second effect, the second cell will have the first effect and the second effect, and both effects will be applied to the image instance in the cell. Alternatively, a new cell is created having the effects of both cells. Thus, cells can have an unlimited number of effects.

The user can select a cell (200, 202, 204, 206, 208, 210, 212, 214, and 216) to indicate selection of a desired effect. Then, by selecting the camera button 106, the user can capture a still image and have the selected effect applied to it. Alternatively, the user can select a previously captured image 218 in the image strip 104 to apply the selected effect to. By doing so, the selected effect is applied to image 218. The user can later change the effect applied to the image 218 by selecting a different cell.

Figure 4:
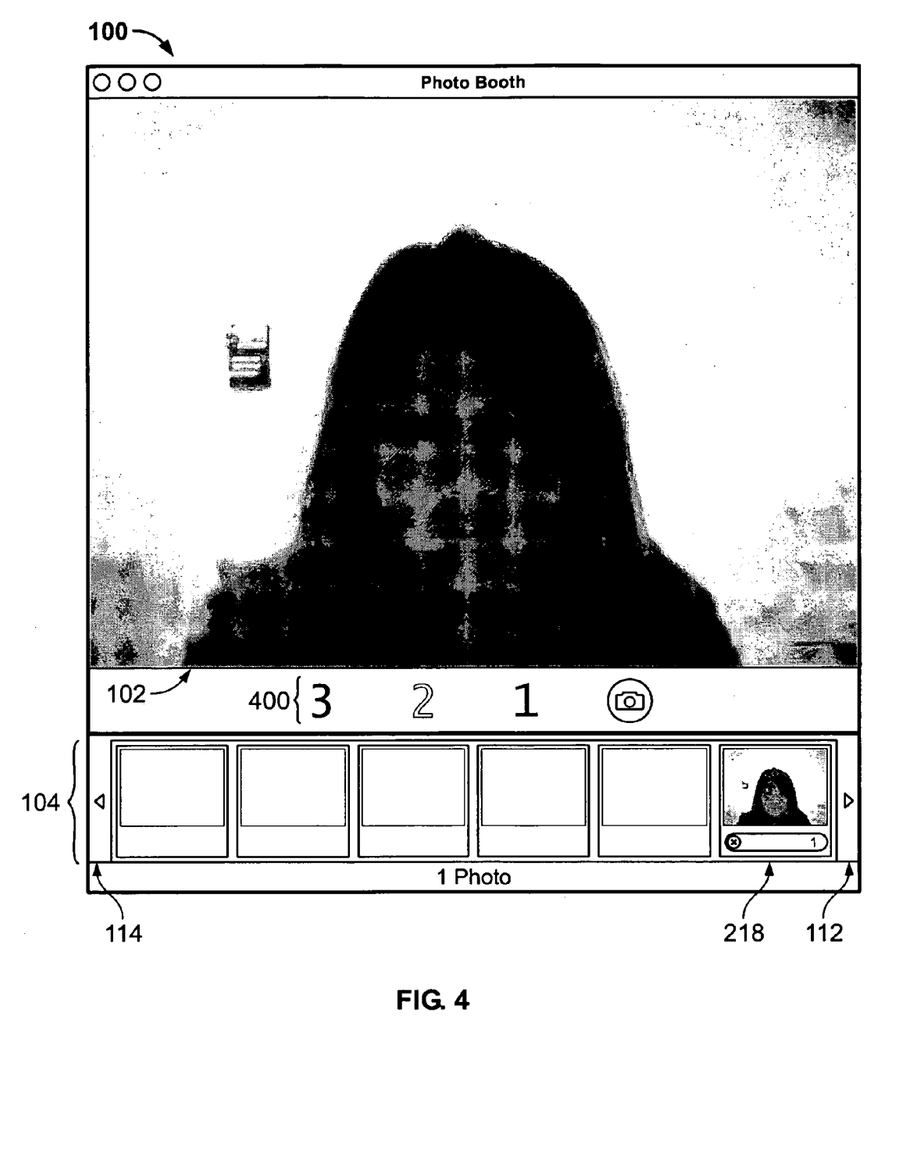
FIG. 4 shows a graphical user interface for capturing an image.

FIG. 4 shows a GUI for capturing an image. Selection of the camera button 106 in FIG. 2 or FIG. 3 switches the display region 102 to show a single, live preview image ("preview mode") without an effect applied as shown here. In another implementation, the live preview image can be shown with the selected effect applied to it. A count-down timer or other suitable user notification can accompany the live image to let the user know that an image is about to be captured. In this illustration, a 3-2-1 count-down timer 400 is shown. As each second (or other time period) passes, a different numeral (e.g., 3, 2, or 1) is highlighted. A sound can also accompany the count-down timer. When the count down completes, the image is captured. In one implementation, the user's display device can "flash" when the image is obtained. Flashing the display device involves adjusting the display device brightness and color to provide illumination of the image target. This also serves as notice to the user that an image is being captured. For example, the display can be made to briefly display all white. Additionally, a sound can accompany the flash. Once the image is obtained, the selected effect (if any) is applied to it. See U.S. patent application Ser. No. 11/249,130, entitled Image Capture Using Display Device as Light Source, filed Oct. 11, 2005 which is incorporated herein by reference.

Figure 5:
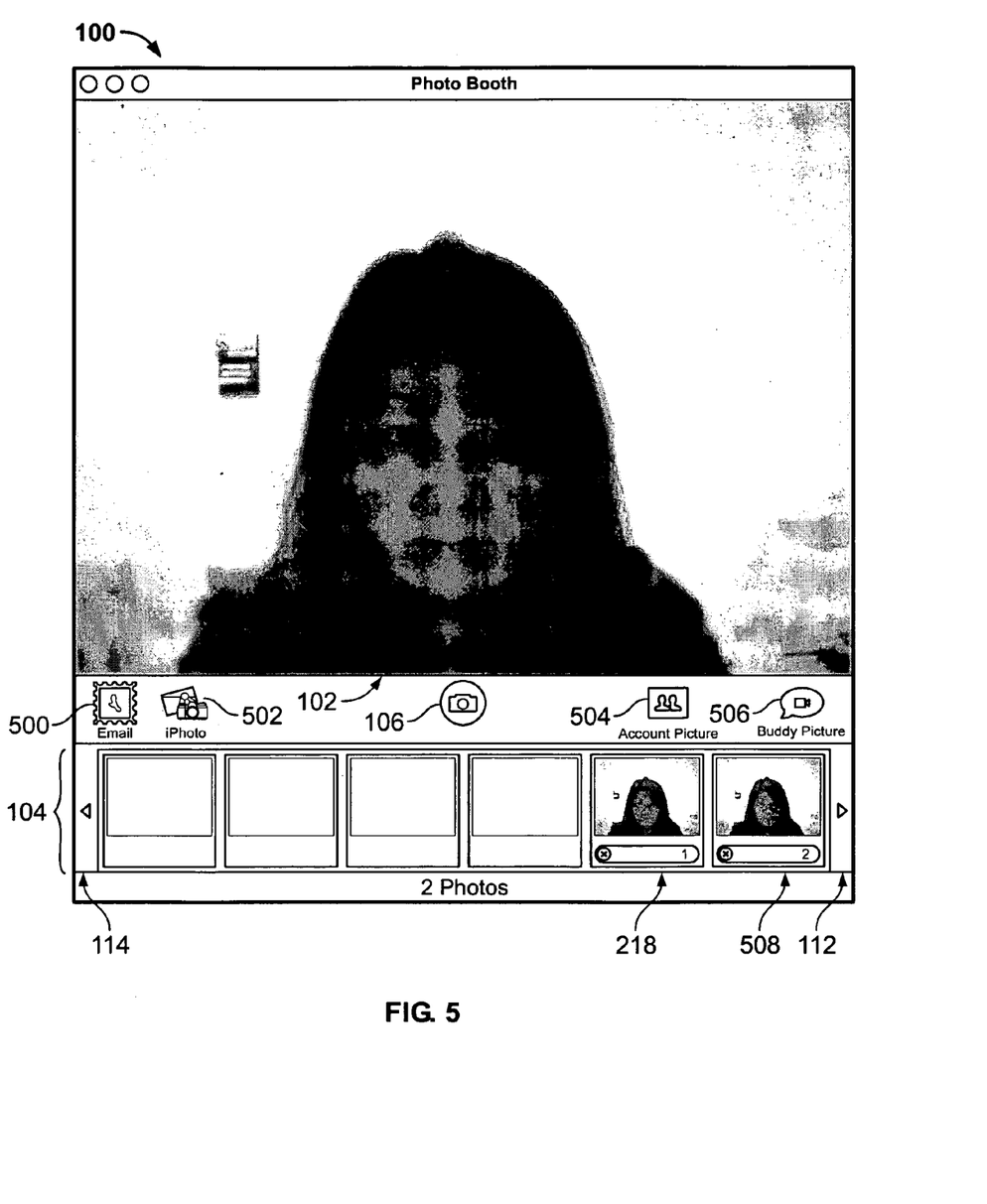
FIG. 5 shows a graphical user interface for transferring a captured image to an application.

FIG. 5 shows a graphical user interface for transferring a captured image to an application. As mentioned earlier, captured images can appear in image strip 104.

In this illustration, newly captured image 508 is displayed along with the earlier captured image 218. A user can transfer any image in the image strip 104 to another application by selecting the image (e.g., image 508) and either selecting an application icon (500, 502, 504, 506) or dragging and dropping the image onto an application icon or onto another application outside of window 100. For example, selection of the application icon 500 will cause the image to be added to an electronic mail message. Selection of icons 502, 504 and 506 add the image to an email message, an account picture and an Internet chat user profile, respectively. The potential number of applications that a captured image can be transferred to is not limited to the four applications discussed here. Any application that can accept image data is suitable (e.g., iPhoto and iChat, available from Apple Computer, Inc.).

In one implementation, an image can be transferred to a target application by saving the image to a file and sending the target application a notification (e.g., a drag and drop GUI event) that refers to the image file. In another implementation, an image can be saved in file at a location where a target application expects to find it and, optionally, with a file name that the target application will recognize.

Figure 6:
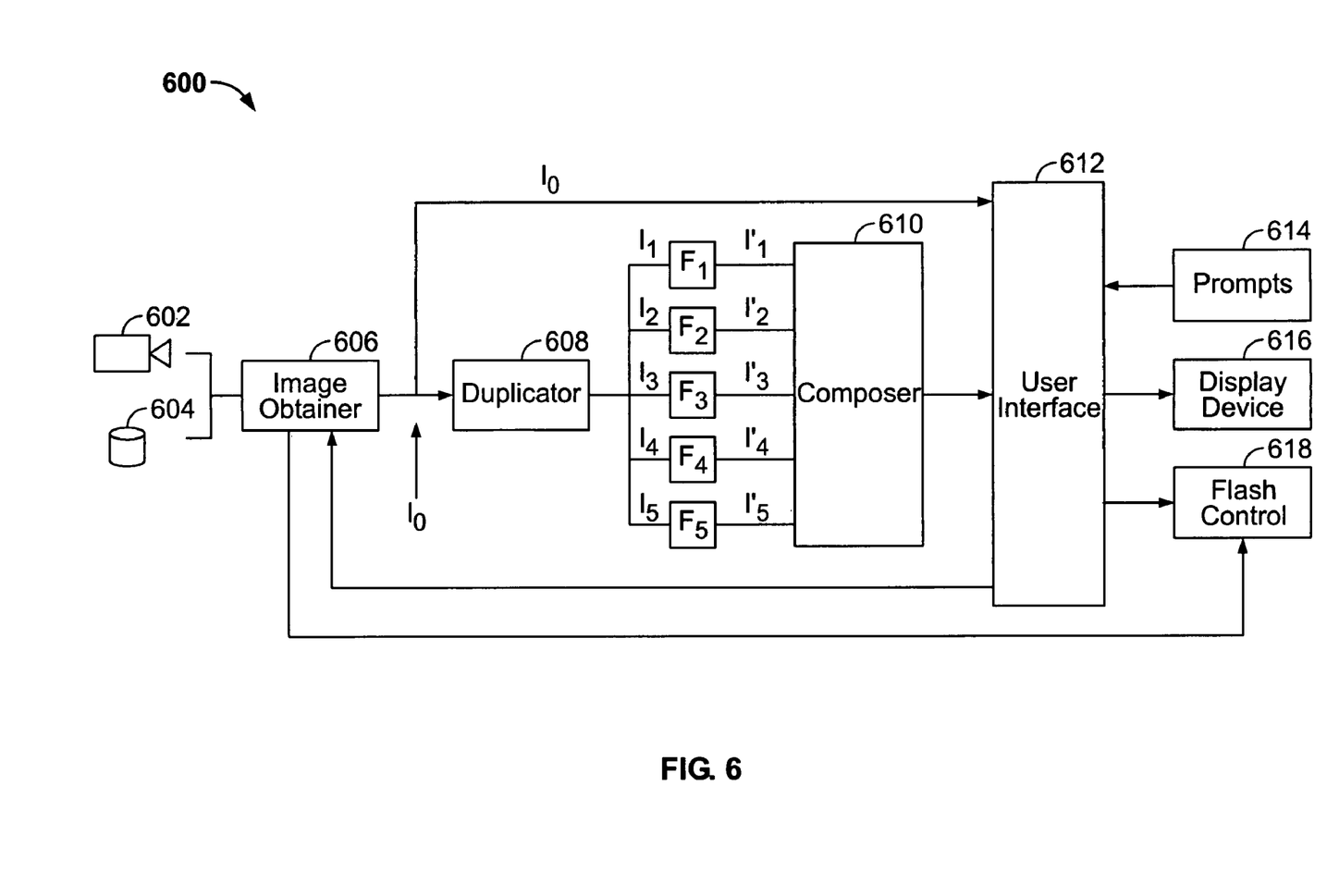
FIG. 6 shows a system for applying effects to image instantiations and still images.

FIG. 6 shows a system 600 for applying effects to image instantiations and still images.

System 600 includes an image obtainer component 606 which receives input data (singularly or as a stream) containing compressed or uncompressed image data from an image source such as a digital image capture device 602 or persistent storage 604. The image capture device 602 (e.g., digital camera) can be capable of capturing still or live images, can be wired or wireless, and can be integrated into a computer, game system, portable game system, portable media player, cellular telephone, portable music player (e.g., an iPod from Apple Computer, Inc.), or other suitable device. In one implementation, the image capture device 602 is an Apple iSight Video Camera, available from Apple Computer, Inc. The iSight camera can be mounted on or located in proximity to a computer user's display device so that the user is in front of the camera, preferably centered.

The image obtainer 606 can prompt the camera to capture an image at the behest of a user or a process. If the image capture device 602 is only capable of capturing live images (e.g., where the input data is a continuous time-ordered sequence of video packets or frames containing image data), the image obtainer 606 can determine which frame in the sequence corresponds to the time when the user or the process requested that an image be captured. For example, this could be the frame that coincides in time with the display device "flash". The image obtainer 606 can optionally receive information from the camera in addition to the input data such as a light measurement and provide this information to other components.

The image obtainer 606 can provide input data (singularly or as a stream) $I_0$ to user interface 512, such as in the case where region 102 of window 100 is in preview mode. Input data $I_0$ can also be provided to duplicator component 608 in which one or more copies of $I_0$ (i.e., $I_1, I_2, I_3, I_4$ and $I_5$) are each individually provided to a corresponding filter (i.e., $F_1, F_2, F_3, F_4,$ and $F_5$). Each filter operates on its respective input data by applying an effect to the input data to create modified input data (i.e., $I'_1, I'_2, I'_3, I'_4, I'_5$). A filter can also apply a null effect, that is, the effect will not modify the input data. For example, the output of a null effect is seen in cell 208 in FIG. 2. In this case, the modified input data is identical to the input data.

Each modified input data ($I'_1, I'_2, I'_3, I'_4, I'_5$) can be provided to a mosaic composer component 610. The mosaic composer 610 prepares the modified input data for display in the user interface 612 (e.g., region 102 of window 100). This can entail extracting image data containing an image from each modified input data, scaling each extracted image to fit in a cell, and updating each cell (200, 202, 204, 206, 208, 210, 212, 214 and 216) with its associated extracted image. Alternatively, the composer 610 can arrange each extracted image into a single mosaic which is used to update region 102 wholesale.

The user interface 612 is rendered on a display device 616 which can optionally serve as a photographic "flash" as described above. A prompt component 614 detects when a user has selected an effect. The prompt component 614 also detects when a user has requested (e.g., by selecting the camera button 106) that an image be captured and communicates this to the user interface 612. The user interface 612 can notify the image obtainer 606 so that the image can be captured (e.g., after a count-down timer has completed). The user interface can also notify a flash component 618 of the requested image capture so that the flash component 618 can "flash" the display device at a time coinciding with the image capture.

Figure 7:
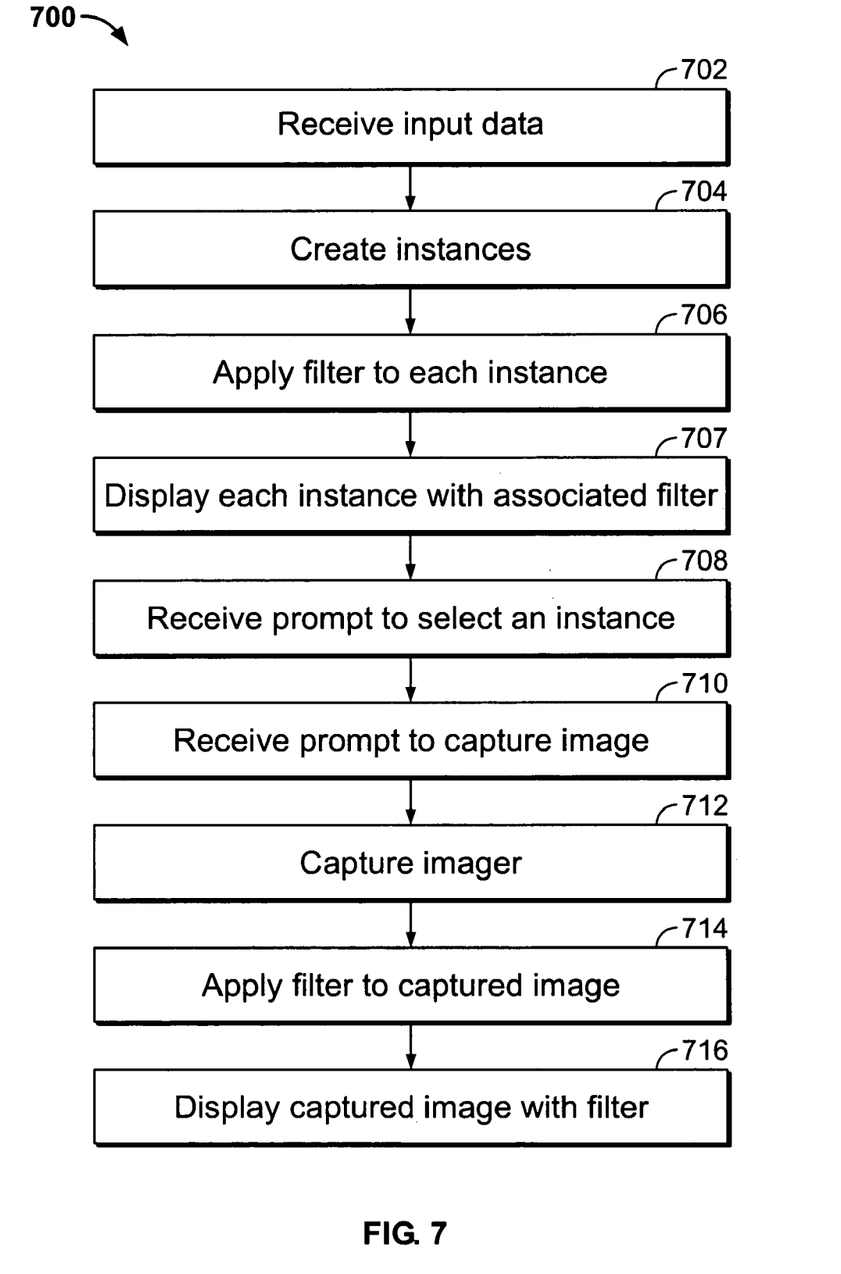
FIG. 7 is a flow chart describing effect selection and image acquisition.

FIG. 7 is a flow chart 700 of effect selection and image acquisition.

Input data containing image data is received singularly or as a stream (step 702). Instances of the input data are created (step 704). A filter is applied to each instance (step 706). Each instance is displayed using its associated filter (step 707) in a mosaic. A prompt is received indicating selection of an instance (step 708). A further prompt is received indicating that an image will be captured (step 712). The image is captured (step 712). The filter associated with the selected instance is applied to the captured image (step 714). The captured image is displayed with the applied filter (step 716).

Figure 8:
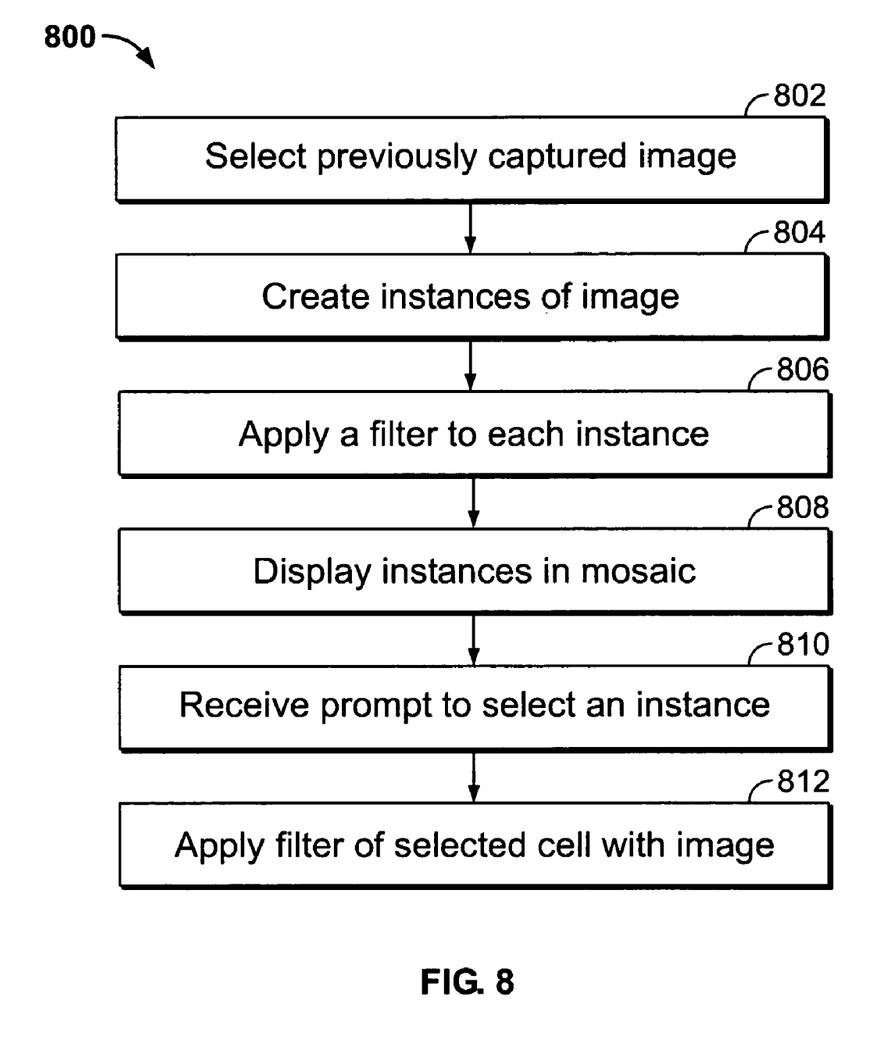
FIG. 8 is a flow chart describing associating an effect with a previously captured image.

FIG. 8 is a flow chart 800 of a process for associating an effect with a previously captured image.

A previously captured image having an associated filter is selected in the image strip 104 (step 802). Instances of the image are created without the associated filter (step 804). Filters are applied to each instance to create modified instances (step '806). Each modified instance is displayed in a unique cell in a mosaic (step 808). A prompt is received indicating selection of a modified instance (step 810). The filter that was applied to the selected modified instance is applied to the image (step 812).

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. A computer can be any electronic computing device, such as for example and without limitation, a handheld or other portable device, cell phone, consumer electronic device, embedded device, or other suitable device. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiment of the invention have been described. Nevertheless, it will be understood that various modifications may be made without departing from the spirit and scope of the invention. Accordingly, other embodiments are within the scope of the following claims.

What is claimed is:

1. A computer-implemented method, comprising:
    providing for display a mosaic having a first cell and a second cell, the first cell displaying a video with a first visual effect, the second cell displaying the video with a second visual effect, the second visual effect being different from the first visual effect;
    receiving a selection of the first cell and the second cell, the selection including a drag and drop input that drags the first cell and drops the first cell onto the second cell;
    creating a third visual effect, the third visual effect including both the first visual effect and the second visual effect; and
    capturing at least one frame of the video; and
    applying the third visual effect to the captured frame of the video.

2. The method of claim 1, comprising:
    illuminating a subject of the video using a flash of a user interface displaying the mosaic.

3. The method of claim 2, wherein applying the third visual to the captured frame comprises:
    selecting the frame from the video, the frame substantially coinciding in time with the flash of the user interface; and
    applying the third visual effect to the selected frame.

4. The method of claim 1, wherein the first visual effect and the second visual effect include at least one of: cropping, flipping, adding one or more borders, adding one or more backdrops, scaling, color manipulation, blurring, sharpening, distorting, geometric transforming, and pattern generating.

5. The method of claim 1, comprising providing for display controls operable to send a captured frame of the video as input to an application program.

6. The method of claim 5, wherein the application program is an instant messaging application and the captured frame is used as a representation of a participant in an instant messaging session.

7. The method of claim 1, comprising providing for display an image strip displaying a sequence of captured frames, the image strip operable to display different portions of the sequence of captured frames.

8. The method of claim 1, wherein the video includes at least one of a digital image or a video feed.

9. The method of claim 8, wherein the video feed is a live video feed.

10. The method of claim 9, wherein:
the mosaic is displayed on a display of a computing device; and
the live video feed is captured by a camera device coupled to or embedded in the computing device, the camera device being oriented in such a way that a user of the computing device is in a front of the camera device.

11. A computer-readable medium having stored thereon instructions, which, when executed by a processor, causes the processor to perform operations comprising:
providing for display a mosaic having a first cell and a second cell, the first cell displaying a portion of a live video feed of a subject with a first visual effect, the second cell displaying the portion of the live video feed with a second visual effect, the second visual effect being different from the first visual effect;
receiving a selection of the first cell and the second cell, the selection including a drag and drop input that drags the first cell and drops the first cell onto the second cell;
creating a third visual effect, the third visual effect including both the first visual effect and the second visual effect;
receiving an image capture input;
in response to the image capture input, capturing from the live video feed a digital image;
applying the third visual effect to the digital image; and
providing for display the captured digital image with the third visual effect.

12. The computer-readable medium of claim 11, the operations comprising:
illuminating the subject using a flash of a user interface in which the mosaic is displayed.

13. The computer-readable medium of claim 12, wherein applying the third visual effect to the digital image comprises:
selecting a frame from the portion of the video feed, the frame substantially coinciding in time with the flash of the user interface; and
applying the third visual effect to the selected frame.

14. The computer-readable medium of claim 11, wherein the first visual effect and the second visual effect include at least one of: cropping, flipping, adding one or more borders, adding one or more backdrops, scaling, color manipulating, blurring, sharpening, distorting, geometric transforming, and pattern generating.

15. The computer-readable medium of claim 11, comprising:
providing for display controls operable to send one or more captured digital images as input to an application program.

16. The computer-readable medium of claim 15, wherein the application program is an instant messaging application and the captured digital image includes a participant in an instant messaging session.

17. The computer-readable medium of claim 11, comprising:
providing for display an image strip displaying a sequence of captured digital images, the image strip operable to display different portions of the sequence of captured digital images.

18. The computer-readable medium of claim 11, wherein:
the mosaic is displayed on a display device coupled to the processor;
the live video feed is captured by a camera device coupled to the processor; and
the subject is a user, where the camera device is configured such that the user is in a front of the camera device.

19. A system comprising:
a digital image capture device; and
a processor operatively coupled to the digital capture device, the processor configurable to perform operations comprising:
providing for display a mosaic having a first cell and a second cell, the first cell displaying a video with a first visual effect, the second cell displaying the video with a second visual effect, the second visual effect being different from the first visual effect;
receiving a selection of the first cell and the second cell, the selection including a drag and drop input that drags the first cell and drops the first cell onto the second cell;
creating a third visual effect, the third visual effect including both the first visual effect and the second visual effect;
capturing from the video a digital image; and
applying the third visual effect to the digital image.

20. The system of claim 19, the operations comprising:
illuminating a subject of the video using a flash of a user interface displaying the mosaic.

21. The system of claim 20, wherein applying the third visual effect to the digital image comprises:
selecting a frame from the video, the frame substantially coinciding in time with the flash of the user interface; and
applying the third visual effect to the selected frame.

22. The system of claim 19, wherein the first visual effect and the second visual effect include at least one of: cropping, flipping, adding one or more borders, adding one or more backdrops, scaling, color manipulating, blurring, sharpening, distorting, geometric transforming, and pattern generating.

23. The system of claim 19, the operations comprising:
providing for display controls operable to send one or more captured digital images as input to an application program.

24. The system of claim 23, wherein the application program is an instant messaging application and the captured digital image includes a participant in an instant messaging session.

25. The system of claim 19, the operations comprising:
providing for display an image strip displaying a sequence of captured digital images, the image strip operable to display different portions of the sequence of captured digital images.

26. The system of claim 19, wherein the video includes at least one of a still image and a video feed.

27. The system of claim 26, wherein the video feed is a live video feed.

28. The system of claim 27, wherein:
the mosaic is displayed on a display device of the system;
the live video feed is captured by the digital image capture device; and
a subject of the video feed includes a user of the system.

29. A method executed by a computing device, comprising:
receiving at least a portion of a video feed;
providing for display a mosaic in a single user interface of a single display device, the mosaic including a first cell a second cell, and a third cell, the first cell displaying the portion of the video with a first visual effect, the second cell displaying the portion of the video feed with a second visual effect that differs from the first visual effect, the third cell displaying the portion of the video feed without a visual effect or with a null effect;
receiving a selection input from the single user interface, the selection input selecting at least one of the first cell or second cell in the mosaic; and
upon receiving the selection input:
switching the mosaic to a display of the video feed, including applying the visual effect of the selected cell to the video feed; and
capturing from the video feed a digital image, including applying the identified visual effect to the digital image.

30. The method of claim 29, where the mosaic includes a plurality of rows of cells and a plurality of columns of cells that display the portion of the video feed.

31. The method of claim 30, where the mosaic includes a square grid of nine cells and a center cell of the square grid displays the portion of the video feed without a visual effect or with the null effect.

32. The method of claim 29, comprising:
providing for display, in the single user interface, a control that is operable for selecting a mosaic from a set of mosaics to be displayed in the single user interface, where each mosaic is associated with a different set of visual effects.

33. The method of claim 29, where the video feed is a live video feed.

34. The method of claim 29, comprising illuminating a subject of the video using a flash of a user interface displaying the mosaic.

35. The method of claim 29, comprising providing for display a control operable to send one or more captured digital images as input to an application program.

36. The method of claim 35, wherein the application program is an instant messaging application and the captured digital image includes a participant in an instant messaging session.

37. The method of claim 29, comprising providing for display an image strip displaying a sequence of captured digital images, the image strip operable to display different portions of the sequence of captured digital images.

38. The method of claim 29, wherein the first visual effect and the second visual effect include at least one of: cropping, flipping, adding one or more borders, adding one or more backdrops, scaling, color manipulating, blurring, sharpening, distorting, geometric transforming, and pattern generating.

39. A computer-readable medium having stored thereon instructions, which, when executed by a processor, causes the processor to perform operations comprising:
receiving at least a portion of a video feed;
providing for display a mosaic in a single user interface of a single display device, the mosaic including a first cell, a second cell, and a third cell, the first cell displaying the portion of the video with a first visual effect, the second cell displaying the portion of the video feed with a second visual effect that differs from the first visual effect, the third cell displaying the portion of the video feed without a visual effect or with a null effect;
receiving a selection input from the single user interface, the selection input selecting at least one of the first cell or second cell in the mosaic; and
upon receiving the selection input:
switching the mosaic to a display of the video feed, including applying the visual effect of the selected cell to the video feed; and
capturing from the video feed a digital image, including applying the identified visual effect to the digital image.

40. The medium of claim 39, where the mosaic includes a plurality of rows of cells and a plurality of columns of cells that display the portion of the video feed.

41. The medium of claim 40, where the mosaic includes a square grid of nine cells and a center cell of the square grid displays the portion of the video feed without a visual effect or with the null effect.

42. The medium of claim 39, the operations comprising:
providing for display, in the single user interface, a control that is operable for selecting a mosaic from a set of mosaics to be displayed in the single user interface, where each mosaic is associated with a different set of visual effects.

43. The medium of claim 39, where the video feed is a live video feed.

44. The medium of claim 39, the operations comprising illuminating a subject of the video using a flash of a user interface displaying the mosaic.

45. The medium of claim 39, the operations comprising providing for display a control operable to send one or more captured digital images as input to an application program.

46. The medium of claim 45, wherein the application program is an instant messaging application and the captured digital image includes a participant in an instant messaging session.

47. The medium of claim 39, the operations comprising providing for display an image strip displaying a sequence of captured digital images, the image strip operable to display different portions of the sequence of captured digital images.

48. The medium of claim 39, wherein the first visual effect and the second visual effect include at least one of: cropping, flipping, adding one or more borders, adding one or more backdrops, scaling, color manipulating, blurring, sharpening, distorting, geometric transforming, and pattern generating.

49. A system, comprising:
one or more computers configured to perform operations comprising:
receiving at least a portion of a video feed;
providing for display a mosaic in a single user interface of a single display device, the mosaic including a first cell, a second cell, and a third cell, the first cell displaying the portion of the video with a first visual effect, the second cell displaying the portion of the video feed with a second visual effect that differs from the first visual effect, the third cell displaying the portion of the video feed without a visual effect or with a null effect;
receiving a selection input from the single user interface, the selection input selecting at least one of the first cell or second cell in the mosaic; and
upon receiving the selection input:

switching the mosaic to a display of the video feed, including applying the visual effect of the selected cell to the video feed; and capturing from the video feed a digital image, including applying the identified visual effect to the digital image.

50. The system of claim 49, where the mosaic includes a plurality of rows of cells and a plurality of columns of cells that display the portion of the video feed.

51. The system of claim 50, where the mosaic includes a square grid of nine cells and a center cell of the square grid displays the portion of the video feed without a visual effect or with the null effect.

52. The system of claim 49, the operations comprising:
providing for display, in the single user interface, a control that is operable for selecting a mosaic from a set of mosaics to be displayed in the single user interface, where each mosaic is associated with a different set of visual effects.

53. The system of claim 49, where the video feed is a live video feed.

54. The system of claim 49, the operations comprising illuminating a subject of the video using a flash of a user interface displaying the mosaic.

55. The system of claim 49, the operations comprising providing for display a control operable to send one or more captured digital images as input to an application program.

56. The system of claim 55, wherein the application program is an instant messaging application and the captured digital image includes a participant in an instant messaging session.

57. The system of claim 49, the operations comprising providing for display an image strip displaying a sequence of captured digital images, the image strip operable to display different portions of the sequence of captured digital images.

58. The system of claim 49, wherein the first visual effect and the second visual effect include at least one of: cropping, flipping, adding one or more borders, adding one or more backdrops, scaling, color manipulating, blurring, sharpening, distorting, geometric transforming, and pattern generating.

* * * * *

UNITED STATES PATENT AND TRADEMARK OFFICE
CERTIFICATE OF CORRECTION

| | | |
|---|---|---|
| PATENT NO. | : 8,085,318 B2 | Page 1 of 1 |
| APPLICATION NO. | : 11/248630 | |
| DATED | : December 27, 2011 | |
| INVENTOR(S) | : Ciudad et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this
Twenty-ninth Day of May, 2012

David J. Kappos
*Director of the United States Patent and Trademark Office*